United States Patent [19]

Reafler

[11] Patent Number: 5,114,789
[45] Date of Patent: May 19, 1992

[54] PROTECTIVE AND DECORATIVE SHEET MATERIAL HAVING A TRANSPARENT TOPCOAT

[75] Inventor: Gerald G. Reafler, Rochester, N.Y.

[73] Assignee: Eastman Kodak Company, Rochester, N.Y.

[21] Appl. No.: 287,417

[22] Filed: Dec. 20, 1988

Related U.S. Application Data

[63] Continuation-in-part of Ser. No. 116,426, Nov. 3, 1987, abandoned.

[51] Int. Cl.⁵ .............................................. B32B 5/16
[52] U.S. Cl. .................................... 428/328; 428/339; 428/343; 428/354; 428/423.1; 428/483
[58] Field of Search ............... 428/323, 328, 343, 339, 428/354, 423.1, 483

[56] References Cited

U.S. PATENT DOCUMENTS

| | | | |
|---|---|---|---|
| 3,551,232 | 12/1970 | Thompson | 156/87 |
| 3,679,506 | 7/1972 | Burgess et al. | 156/209 |
| 4,368,224 | 1/1983 | Jackson | 428/31 |
| 4,403,003 | 9/1983 | Backhouse | 427/407.1 |
| 4,451,522 | 5/1984 | de Vroom | 428/201 |
| 4,605,596 | 8/1986 | Fry | 428/423.3 |
| 4,652,470 | 3/1987 | Das et al. | 427/407 |
| 4,769,100 | 9/1988 | Short et al. | 156/285 |
| 4,810,540 | 3/1989 | Ellison et al. | 428/31 |
| 4,868,030 | 9/1989 | Mentzer et al. | 428/174 |

FOREIGN PATENT DOCUMENTS

| | | |
|---|---|---|
| 0251546 | 6/1987 | European Pat. Off. |
| 230364 | 7/1987 | European Pat. Off. |
| 0285071 | 3/1988 | European Pat. Off. |
| 2084513 | 10/1981 | United Kingdom |

OTHER PUBLICATIONS

Backhouse, "Routes to Low Pollution Glamour Metallic Automotive Finishes", *J. Coatings Tech.*, vol. 54, No. 693, pp. 83-90, Oct. 1982, Research Disclosure 24303.
Mirgel et al., "PU Coatings Stand Out for Plastic Auto Parts", *Plastic Engineering*, pp. 31-33, Dec. 1986.

*Primary Examiner*—George F. Lesmes
*Assistant Examiner*—Terrel Morris
*Attorney, Agent, or Firm*—Alfred P. Lorenzo

[57] ABSTRACT

A protective and decorative sheet material for covering substrates comprises a flexible carrier film, a paint layer adhered to one surface of the carrier film containing light reflective flakes;

a transparent polymeric topcoat overlying and adhered to the paint layer having a thickness of at least about 0.1 millimeter.

The sheet material has a substantially unstressed relaxed state and a relaxed area and is heat softenable to a substantially plastic state in which it is extendable to an extended state having an extended area up to at least 50% greater than the relaxed area. The paint and topcoat layers have substantially uniform quality and appearance in both the relaxed and extended states. The thick transparent topcoat provides improved retention of gloss and distinctness of image when the sheet material is stretched. A method of preparing the sheet material comprises the step of extruding in laminar flow a layer of a crosslinkable transparent topcoat composition over the paint layer.

10 Claims, 3 Drawing Sheets

5,114,789

PROTECTIVE AND DECORATIVE SHEET MATERIAL HAVING A TRANSPARENT TOPCOAT

RELATED APPLICATIONS

This application is a continuation-in-part of U.S. patent application Ser. No. 116,426 filed Nov. 3, 1987 in the name of G. G. Reafler now abandoned.

FIELD OF THE INVENTION

This invention relates to a protective and decorative sheet material and to a method for the preparation thereof. More specifically, it relates to a flexible, thermoformable sheet material that can be bonded to various substrates, including exterior automotive panels, as a protective and decorative covering.

BACKGROUND OF THE INVENTION

The invention will be described with reference to providing protective and decorative finishes on exterior automotive panels, but it should be understood that the automobile is only one of many substrates to which the sheet material of the invention can be applied.

As pointed out in an article by Alan J. Backhouse entitled "Routes To Low Pollution Glamour Metallic Automotive Finishes", Journal of Coatings Technology, Vol. 54, No. 693, pages 83-90, October 1982, there is a growing need to reduce the amount of atmospheric pollution caused by solvents emitted during industrial painting processes. Many different approaches have been proposed. For example, efforts have been made to replace the solvent-based paints used for automobiles with water-based paints. Work has also been done on the use of high solids formulations to lessen the emission or organic solvents. However, the application of automotive finishes is a highly demanding art because of the extremely high quality of the surface finish required and because of the common application of metallic finishes to provide what Backhouse refers to as "high stylistic effects". Accordingly, past efforts to replace the low viscosity, low-solids-content paint formulations conventionally used in spray painting operations in the automotive industry have met with limited success.

A more promising approach is to eliminate entirely the need for spray painting. Elimination of spray painting, or reduction in its use, would not only reduce atmospheric pollution, but would provide cost savings in that spray painting operations are so wasteful that more than half of the paint may be wasted. A means for achieving such goal exists through the use of a preformed thermoplastic sheet material which can be bonded to the panel to provide the protective and decorative coating. Such techniques have been utilized for interior automobile panels as described, for example, in U.S. Pat. No. 3,551,232 issued Dec. 29, 1970.

The objective of U.S. Pat. No. 3,551,232 is to overcome the problems of bubbling and blistering of the resin sheet that tend to occur in the vacuum-forming process. It achieves this by use of an adhesive containing an inert particulate filler which minimizes the entrapment of air.

To employ a process of the type described in U.S. Pat. No. 3,511,232 with exterior automotive panels presents a greater challenge. The surface appearance of such panels is of critical importance, so that it is necessary not only to avoid bubbling or blistering caused by entrapped air, but to provide a protective and decorative coating that will equal or exceed the quality of a spray-painted surface. Furthermore, exterior automotive panels present a particular problem in view of the difficulty of smoothly adhering a flexible sheet material to a curved substrate and the difficulty of doing so while maintaining over the entire surface a uniform color intensity.

Efforts have been made by others to produce a flexible and stretchable sheet material having these capabilities through the application of one or more paint layers to the surface of a thermoformable polymeric support. However, prior to the invention of Reafler, U.S. patent application Ser. No. 116,426 now abandoned, it is believed that these efforts have resulted in products having numerous coating defects and in which the paint layer does not have the high degree of uniformity which permits the sheet material to undergo the stresses of thermoforming and yet meet the exacting standards of an exterior automotive finish.

In accordance with the invention of the Reafler patent application, a flexible and stretchable sheet material that is (1) capable of meeting the requirements of an exterior automotive finish and (2) capable of withstanding the stretching and bending forces involved in bonding it to exterior automotive panels is produced by precision coating techniques which provide exacting control of the thickness and thickness uniformity of the coatings. Moreover, such coating techniques provide essentially defect-free coatings having a substantially uniform quality and appearance.

The sheet material of the Reafler application comprises a thin flexible carrier film, and a protective and decorative paint layer, also known as a basecoat, adhered to one surface of the carrier film. The carrier film has heat-softening and tensile elongation properties which adapt it to use in the thermoforming process and the paint layer has compatible heat softening and tensile elongation properties. As a result, the sheet material can undergo substantial elongation without crazing or delamination of the protective and decorative paint layer.

The sheet material has a substantially unstressed relaxed state and a relaxed area and is heat softenable to a substantially plastic state in which it is plastically extendable and formable over irregular surfaces to an extended state having an extended area at least 50% greater than the relaxed area. The protective and decorative paint layer has a substantially uniform quality and appearance both in the relaxed and extended states. The sheet material can be stretched and bonded to a three-dimensional substrate as a smooth and wrinkle-free protective and decorative coating of uniformly attractive appearance.

The Reafler application also discloses a process for the manufacture of the sheet material comprising the steps of: providing a thin, flexible carrier film; providing a fluid protective and decorative film-forming composition; forming a laminar flow of the composition and directing the flow into contact with the surface of the carrier film to form thereon a protective and decorative layer of substantially uniform thickness; and converting the protective and decorative layer to a dry and tack-free state. The protective and decorative film-forming composition is advantageously coated over an adhesion-promoting tie-layer. The process provides an essentially defect-free coating with a high degree of uniformity of layer thickness and a substantially uniform quality and appearance.

In an important embodiment of the sheet material, for which the present invention provides an improvement, the paint layer comprises a film-forming binder, a colorant and generally flat, light-reflecting particles which are oriented by the laminar flow process; that is, they are preferentially oriented substantially parallel to the surface of the layer. This provides a paint layer characterized by a high degree of geometric metamerism, a property commonly referred to as "flop."

The preferred embodiment of the sheet material, for which the present invention provides an improvement, also includes a transparent topcoat comprising a clear or lightly colored polymer. This topcoat is also called a clearcoat. The carrier film, paint layer and topcoat layer have compatible heat-softening and tensile elongation properties which render the sheet material suitable for use in a thermoforming process. Also the carrier film, paint layer and topcoat layers are of such uniform character that the sheet material has substantially the same uniformity of appearance before and after the thermoforming process.

The transparent topcoat provides a number of desired properties. These include resistance to abrasion and to weathering. It can also improve the surface qualities of gloss and distinctness of image (DOI). Since the sheet materials are especially intended for use as automotive coverings which demand high gloss and other surface qualities; further improvement in these qualities is desirable. Especially it is desirable to reduce or eliminate any tendency toward loss of gloss or of DOI when the material is stretched during thermoforming. Since the paint layer and clearcoat are coated on stretchable carrier films rather than on rigid surfaces and are coated by laminar flow methods rather than by the usual spraying processes for automotive finishes, the existing automotive finishing literature gives little or no guidance as to ways for improving or retaining the gloss or DOI of these sheet materials when stretched.

SUMMARY OF THE INVENTION

The present invention relates to the embodiment of the invention of the parent application wherein the sheet material has a transparent, polymeric topcoat and the paint layer contains light reflective flakes. It provides an improvement by reducing or eliminating loss of gloss and DOI of the sheet material when it is stretched.

Accordingly, the sheet material of the invention comprises a thin flexible carrier film;

a protective and decorative paint layer adhered to one surface of the carrier film; the paint layer having an outer surface and containing generally flat light reflective flakes; and a transparent topcoat layer overlying the paint layer, the topcoat layer having a thickness of at least about 0.1 millimeter. The sheet material has a substantially unstressed relaxed state and a relaxed area and is heat softenable to a substantially plastic state in which it is plastically extendable and formable over irregular surfaces to an extended state having an extended area at least 50% greater than the relaxed area. The paint layer is adhered to the carrier film and the topcoat layer is adhered to the paint layer. The sheet material has a substantially uniform quality and appearance both in its relaxed and its extended states.

The invention also includes the method by which the sheet material of the invention is manufactured. This method comprises continuously passing a carrier film web having a light reflective flake-containing paint layer thereon in close proximity to the narrow extrusion slot of an extrusion coating hopper and extruding in laminar flow over the paint layer, a crosslinking, transparent topcoat composition, passing the web having a wet topcoat layer directly from the coating hopper to a drying chamber wherein the topcoat layer is dried and cured in a series of stages of successively increasing temperatures, the speed of the web and the rate of extrusion of the topcoat composition being such that the thickness of the topcoat after drying is greater than 0.1 mm, and producing a dry topcoat layer of uniform thickness and appearance that is substantially free of defects and that when stretched 50 percent has a 20 degree gloss of at least 80.

DESCRIPTION OF THE PREFERRED EMBODIMENTS

Figure 1:
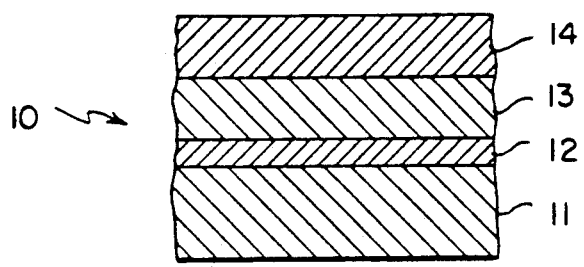
FIGS. 1 and 2 are enlarged cross-sectional views of a sheet material of the present invention.

Referring now to FIG. 1, there is shown a sheet material 10 in accordance with the invention which comprises a flexible, thermoformable carrier film 11, a thin tie-layer 12, and a paint layer 13 which contains light-reflective flakes such as aluminum flakes.

As a consequence of the laminar flow coating method by means of which the paint layer preferably is formed, the light reflective flakes are preferentially oriented substantially parallel to the surface of the paint layer. Most preferably, at least 75% of the flakes have an orientation within 12 degrees of parallelism with the paint layer surface. Over the paint layer is a thick layer 14 of a transparent topcoat composition. This, preferably is a clear polymeric composition and most preferably is crosslinked.

Figure 2:
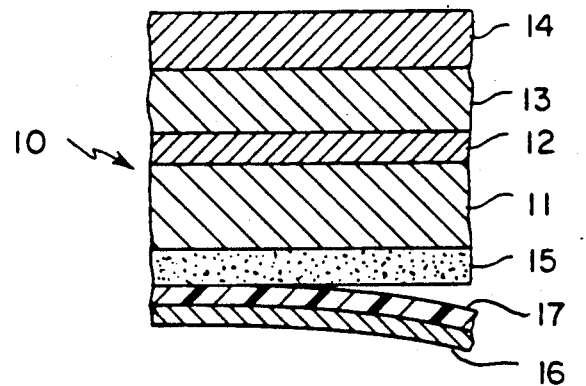

As shown in FIG. 2, on the opposite surface of carrier film 11 is coated an optional adhesive layer 15. This can be, for example, a pressure-sensitive or a heat-activated adhesive. An adhesive layer is desirable when the sheet material is to be bonded to substrates such as automobile parts by vacuum thermoforming. In other methods of bonding, such as the "in-mold" technique, which is a known method of laminating a thermoplastic sheet to a plastic article while molding the article, an adhesive layer is not needed.

To protect the pressure-sensitive adhesive layer, a release sheet of polyester film 16 or the like can be adhered to it and then stripped away before the sheet material is thermoformed and bonded to a substrate. An optional release coating 17, e.g., a silicone coating, can be on sheet 16 to aid in stripping it from the adhesive layer.

A characteristic of the described sheet material having a paint layer which contains light-reflective flakes such as aluminum flakes is that it tends to lose gloss when stretched beyond certain limits during thermoforming. This is true even when the sheet material has a glossy, clear, thin topcoat. In accordance with the present invention, the loss of gloss with stretching is reduced or eliminated if the transparent topcoat is made sufficiently thick. More particularly, if the topcoat is at least 0.1 millimeter in thickness, marked improvement occurs in the retention of gloss by such sheet material when stretched.

Although the method of the present invention is characterized particularly by the manner in which the clearcoat is formed, other steps of the overall method take place first. To describe the normal sequence, therefore, the earlier steps will be described first.

Figure 3:
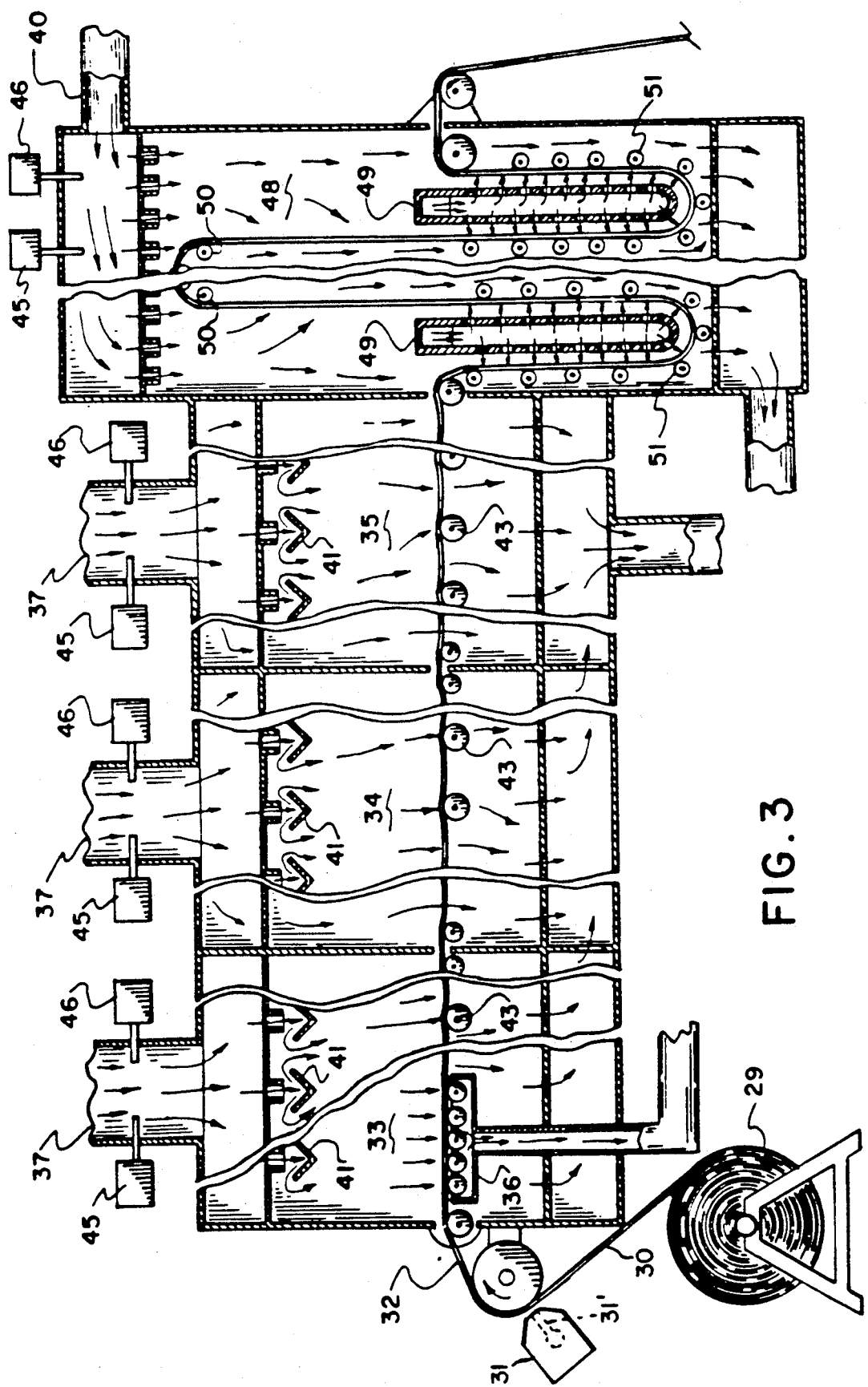
FIG. 3 is a diagrammatic side view of an apparatus for carrying out the process of the invention.

FIG. 3 illustrates diagrammatically a preferred coating and drying apparatus which can be used in the method of the invention. Coating hopper 31 is an extrusion coating hopper such as the type disclosed by Beguin, U.S. Pat. No. 2,681,294. The coating hopper extrudes in laminar flow through a narrow slot a horizontally extending bead of the coating liquid in contact with the continuously moving film web 30. The coating composition is thus coated as a uniform layer onto the surface of the web. The first layer coated on the web can be tie-layer 12 or paint layer 13, as shown in FIG. 1. In either case, the carrier film web supplied by roll 29, whether or not previously coated, passes in close proximity to the narrow extrusion slot 31' of the coating hopper 31. As the web passes the hopper, a laminar flow of the coating composition is extruded on the web, the entire thickness of the coating for that particular pass being applied simultaneously across the width of the web. Promptly after being coated, the web having the wet layer on its surface is drawn through the drying apparatus.

The drying apparatus can be a flat bed and vertical loop, warm air dryer generally of the type described in the aforementioned Reafler Patent Application. It can also be modified for preferred conditions of drying of aqueous paint layers as described in the copending patent application of Fronheiser et al, Ser. No. 166,083 filed Mar. 9, 1988, now U.S. Pat. No. 4,872,270.

The coated web 32 is pulled or drawn by take-up rollers not shown in the drawing through successive stages of the drying apparatus. These include initial drying stages 33, 34, 35 and final curing stage 48. Preferably the stages are at successively higher temperatures, the temperatures of the initial stages of the drying zone being mild. This is especially desirable when drying an aqueous paint which contains water and organic solvents. The final stage or stages, however, can be at high temperatures to remove residual liquids and/or to cure the crosslinkable topcoat. For example, heated air can be introduced at 27° C., 43° C. and 66° C. via lines 37 at stages 33, 34 and 35, respectively. Baffles 41 divert the air flow away from the top of the film and cause it to flow to lower regions of the drying chamber. Sensing controls 45 and 46 aid in maintaining the appropriate air temperature and humidity by feedback mechanisms not shown in the drawing. The speed of the web is such that the coating is subjected to elevated temperature for a substantial time, e.g., for 3 to 6 minutes, in the final stage 48 where the air is admitted via line 40 at about 80° C.

Preferably, the moving web is also heated from its underside by contact with metal rollers 36 and 43 and other rollers in the several drying stages. These metal rollers of high conductivity are heated by the warm air and they transfer heat to the underside of the web, thus further increasing its temperature. In the final stage 48, the web is heated to its highest temperature as it travels through a vertical path in a floating loop section, being guided by rollers 50 and air reversers of the plenums 49 to keep the coated side of the film out of contact with rollers 51. The dried film leaving stage 48 is wound on a take-up roll not shown in the drawing.

In the preferred method of applying the thick transparent topcoat over the paint layer, the paint layer is coated and dried and thereafter the topcoat is applied by the same laminar flow coating method as described above for applying the tie-layer and paint layer. In this method, the film having on its surface the dried paint layer is again passed in close proximity to the narrow extrusion slot of an extrusion coating hopper 31, as shown in FIG. 3, from which the topcoat composition is extruded in laminar flow. Again, as with the paint layer, the entire thickness of topcoat to be applied in the particular pass is applied simultaneously across the width of the dried paint layer. Promptly thereafter the web having the wet topcoat layer on its surface is drawn through the drying apparatus.

The topcoat for the sheet material of the invention is extremely thick. It is normally preferred to coat such thick layers in two or more passes in order to dry them adequately. For example, if the topcoat dry thickness is to be 0.12 mm, a first pass can coat and dry a layer of 0.06 mm dry thickness and a second pass can coat and dry a second layer to raise the total dry thickness to 0.12 mm. For greater thickness, additional coating and drying passes can be carried out.

For optimum quality the stepwise increase in drying temperatures and other procedures such as humidity control, of the Fronheiser et al. drying process described in U.S. patent application Ser. No. 166,083, now U.S. Pat. No. 4,872,270, are also preferred for drying the topcoat layer.

If the drying conditions are carefully controlled, e.g., by providing small temperature increases from stage to stage and having a lengthy residence time in each stage, the entire thickness of the topcoat can be coated and dried in a single pass. However, since the topcoat is extremely thick in sheet materials of the invention, i.e., greater than 0.1 mm when dry, the best quality is obtained when the topcoat is coated and dried in two or more passes.

It is within the scope of the invention to coat the topcoat simultaneously with the paint layer. This wet-on-wet method of coating can be carried out with laminar flow coating hoppers suitable for simultaneous coating of multiple layers. Examples of such coating hoppers include U.S. Pat. Nos. 2,761,419; 2,761,791 and 3,005,440. Although these simultaneous multilayer coating techniques can be used, best results are obtained when the paint layer is coated and dried separately and then successive layers of the topcoat are coated and dried in two or more separate passes using an extrusion hopper as in U.S. Pat. No. 2,681,294 and drying each layer after it is coated.

The preferred transparent topcoat comprises a crosslinked polymer. Preferably it is formed by mixing a two-component crosslinking composition such as a polymeric polyol solution and a diisocyanate solution which react after mixing to form a crosslinked polyurethane. In coating this composition the preferred procedure is to mix the reactive components just before coating the mixture on the paint layer. The procedure is described in the copending patent application of Hayward et al, Ser. No. 189,090, filed May 2, 1988, now U.S. Pat. No. 4,832,991. As the application describes, the components are fed to a mixing zone and the mixture is extruded in laminar flow through the narrow horizontal extrusion slot of a coating hopper within less than about 50 seconds after being formed in the mixing zone.

The sheet material of this invention includes a thin flexible carrier film. The latter preferably comprises an essentially planar, self-supporting, stretchable, thermoplastic polymeric film. It can be transparent, translucent or opaque. If desired, it can be matched in color to the color of the protective and decorative paint layer by incorporation of a colorant.

Suitable materials for the carrier film include stretchable thermoplastic polymeric films having heat softening and tensile elongation properties which adapt it to use in the thermoforming process. Preferred are those films known to be useful in thermoforming and/or vacuum-forming techniques, such as polyvinyl chloride, polyvinyl acetate, ABS (acrylonitrile-butadiene-styrene) resins, polyethylene and polypropylene. Useful materials include the polyacrylate blends with copolyesters described in U.S. Pat. No. 4,246,381, and the copolyesters derived from aromatic polyesters and glycol polyesters described in U.S. Pat. No. 4,287,325. Blends of rubber-modified styrene-maleic anhydrides with polycarbonates and/or polyesters are also useful, as are blends of poly(ether-esters) and polyesters. Particularly preferred support materials exhibit a tensile elongation at break of at least about 40% when measured in accordance with ASTM D-638. A highly preferred support material is a blend of copolyesters based on poly(1,4-cyclohexylenedimethylene terephthalate) and rubber-modified styrene-maleic anhydride copolymers as described in U.S. Pat. No. 4,582,876. Another preferred carrier film is the highly flexible film made from a blend of poly(etheresters and) polyesters as disclosed in the copending patent application of Seymour Ser. No. 151,727 filed Feb. 3, 1988, now U.S. Pat. No. 4,904,748. The carrier film can include fillers, UV absorbers, plasticizers, colorants, antioxidants, etc. known to be useful in polymeric films.

The paint layer of the sheet material contains light-reflective flakes in addition to a binder and, optionally, a colorant and other addenda such as surfactants, coalescing agents and the like. The light-reflective flakes can be those conventionally employed in paints, particularly those employed in automotive finish paints. These include metallic flakes such as aluminum flake, copper flake, bronze flake, copper bronze flake, nickel flake, zinc flake, magnesium flake, silver flake, gold flake, and platinum flake and other flakes such as mica, glass, coated mica, coated glass and aluminum-coated polyester film fragments. Mixtures of two or more types of such flakes can also be used.

Conventional paint colorants can be employed in combination with such flakes, including inorganic pigments such as titanium, dioxide, iron oxide, chromium oxide, lead chromate, carbon black, silica, talc, china clay, metallic oxides, silicates, chromates, etc., and organic pigments, such as phthalocyanine blue, phthalocyanine green, carbazole violet, anthrapyrimidine yellow, flavanthrone yellow, isoindoline yellow, indanthrone blue, quinacridone violet, perylene reds, diazo red and others.

The film-forming binder for the paint composition can comprise any of the film-forming resins conventionally used as binders in basecoat compositions. Particularly useful are acrylic polymers, polyesters, including alkyds, and polyurethanes. Examples of such binders and methods for the preparation thereof are described in U.S. Pat. Nos. 4,681,811; 4,403,003 and 4,220,679.

Water-based basecoats in color plus-clear compositions are disclosed in U.S. Pat. No. 4,403,003, and the resinous compositions used in preparing these basecoats can be used in the practice of this invention. Also, water-based polyurethanes such as those disclosed in U.S. Pat. Nos. 4,147,679 and 4,719,132 can be used as the resinous binder in the paint layer.

Preferred paints of those described above have been used on external automobile parts made from deformable polyurethanes. Such paints stretch and deform without cracking or delaminating.

The paint layer preferably has a thickness in the range of from about 0.012 to 0.080 millimeters. A particularly preferred mean thickness is in the range of from about 0.020 to 0.060 millimeters.

The heat softening and tensile elongation properties of the paint layer must be compatible with those of the carrier film so as to permit symmetrical elongation. By symmetrical elongation it is meant that the sheet material can undergo substantial elongation by the application of stretching forces without splitting, crazing or delaminating of the paint layer. Applicant's sheet material provides outstanding symmetrical elongation, which results in part from the thickness and thickness uniformity of the layers. The ratio of the mean thickness of the paint layer to the mean thickness of the support preferably is in the range of 1.00 to 0.04 and more preferably in the range of 0.50 to 0.08. Sheet materials having thickness ratios of about 0.2 are especially preferred for obtaining substantial symmetrical elongation without splitting, crazing or delaminating.

Transparent topcoat compositions for use with basecoats are well known in the art. Especially useful are compositions comprising crosslinkable polyols such as polyester polyols, polyurethane polyols and acrylic polyols, admixed with polyisocyanate curing agents. In accordance with this invention, the topcoat composition is extruded through a slot onto the paint layer of the sheet material. This laminar flow method permits the coating of a thick crosslinkable topcoat in one or more passes and results in improved smoothness, excellent gloss and distinctness of image, as compared with topcoats applied by spraying and other non-laminar flow techniques. The topcoat is then dried to a tack-free state.

The dried topcoat layer has a thickness of at least about 0.1 millimeter, preferably of at least 0.125 millimeter. Highly preferred is a clear layer having a dried thickness of at least 0.15 millimeter. Applicant has achieved clearcoat thickness up to 0.25 millimeter using the coating techniques described above.

The carrier film, paint layer and topcoat layer have heat softening and tensile elongation properties which render the sheet material suitable for use in the thermoforming process and which are mutually compatible so as to permit symmetrical elongation, whereby the sheet material can undergo substantial elongation by the application of stretching forces without crazing or delamination of the basecoat and topcoat layers. The carrier film, paint layer and topcoat layer are of sufficiently uniform character that the sheet material exhibits substantially the same uniformity of appearance before and after the thermoforming process.

An adhesion-promoting tie-layer is coated on the carrier film before the basecoat in preferred embodiments of the invention and provides improved bonding strength and reduces the risk of delamination. Suitable tie-layers can be formed from compositions comprising an adhesion promoting species and optionally a suitable solvent. Useful adhesion promoting species include polymers derived from acrylonitrile, vinylidene chloride, and acrylic acid; polymers derived from methylacrylate, vinylidene chloride and itaconic acid; cellulose nitrate, and a variety of commercially available adhesion promoting species, for example, those known under the trade designations FORMVAR 7/95, FORMVAR 15/95, BUTVAR B-98 and BUTVAR B-72, sold by Monsanto, MOBAY M-50 sold by Mobay, VINAC B-15 sold by Air Products, ELVACITE sold by DuPont, and LEXAN sold by General Electric. Suitable solvents include methylethyl ketone, methylene chloride, tetrahydrofuran, toluene, methyl cellosolve, methanol, ethanol, propanol, butanol, mixtures thereof and the like. The adhesion promoting layer preferably has a thickness not greater than about 0.0025 millimeter. The thickness preferably is substantially less than the thickness of the basecoat. For example, the basecoat preferably has a thickness at least 8 times the thickness of the adhesion promoting layer.

It should be noted that the thermoforming process typically involves stretching in all directions rather than just a longitudinal stretching of the sheet material. Thus, the sheet material is extended in area. Prior to thermoforming, the sheet material can be said to be in a relaxed state in which it is substantially unstressed. By the thermoforming process, it is softened to a substantially plastic state and plastically extended to an extended state. The sheet material of this invention is capable of extension to an extended area at least 50% greater than its relaxed area. Moreover, the sheet material of this invention is characterized by having a substantially uniform quality and appearance in both the relaxed and extended states.

As noted, the sheet material of the invention has a substantially uniform quality and appearance both in the relaxed and extended states of the sheet material. This means that in the relaxed state it is essentially free of coating defects such as lines, dimples, bubbles, streaks, banding, repellencies, colorant agglomerations and the like when visually examined under roomlight, on a light box and in sunlight. Furthermore, this means that the sheet material provides a commercially acceptable finish when applied to exterior automobile panels. Moreover, a given relaxed size of sheet material can be stretched different degrees in different areas, or stretched in some areas and not in other areas and the uniformity of appearance in all areas, including distinctness of image, gloss, optical density, and flop remains substantially the same.

The sheet material of this invention preferably exhibits an initial distinctness of image (DOI) of at least 80 as measured by ASTM TEST E-430. Such measurements, for example, can be made on a HUNTERLAB MODEL D47R-6 DORIGON GLOSSMETER. Preferred sheet materials of the invention exhibit an initial DOI of at least 85, and more preferably of at least 90 when measured by this technique.

The sheet material of this invention exhibits an initial 20° gloss of at least 80 when measured in accordance with ASTM TEST D-523. Preferred sheet materials of this invention exhibit a 20° gloss of at least 85 initially and more preferably of at least 90 when measured by this method. When stretched up to 50 percent more than the original area the gloss remains at least about 80.

The sheet material of this invention preferably exhibits an average surface roughness (Ra) of less than 0.4 micron when measured by conventional surface roughness measuring techniques known in the art. For example, Ra can be measured using a scanning type stylus instrument having a skidless probe and a cutoff of about 0.030 in. One such instrument is the Micro-Topographer ® sold by Federal Products Corporation. Particularly preferred sheet materials of this invention exhibit an average surface roughness of less than 0.2 micron and more preferably of less than 0.1 micron.

Laminar flow coating techniques are required in manufacturing the sheet material of the invention. These include direct extrusion onto the support by use of an extrusion hopper functioning to apply the coating composition by a bead coating or a stretch-flow coating mechanism, extrusion of the coating composition through a slot with subsequent travel down the slide surface of a slide hopper or subsequent free fall in a curtain coating process and curtain coating processes in which the curtain is generated by the use of an overflow weir. The critical aspect of the coating process is its ability to provide a defect-free coating with a very high degree of uniformity of layer thickness. In particular, the process must provide such a result even with a thick coating of the crosslinking clearcoat composition.

The use of precision coating processes in the production of the sheet material—such as the use of high precision extrusion hoppers—is an important aspect of the present invention. In particular, the coating operation must be conducted with exacting control of all critical parameters to ensure the high degree of thickness uniformity and the freedom from coating defects that characterize the sheet material of this invention. Only by such control of both thickness uniformity and coating defects, can sheet material be produced which is capable of undergoing the rigors of the thermoforming process and yielding a product with the very high quality demanded of an automotive finish.

Laminar flow extrusion coating hoppers such as disclosed in the patent to Beguin, U.S. Pat. No. 2,681,294, are particularly effective devices for use in the process of this invention. Such devices are well-adapted for use with shear-thinning compositions typical of the paint compositions hereinbefore described. In such hoppers, transverse pressure gradients are minimized and almost all pressure drop across the slot is in the direction of coating. While applicant does not wish to be bound by any theoretical explanation of the manner in which his invention functions, it is believed that such features contribute to the excellent results achieved with an extrusion hopper, especially in the coating of paint compositions containing light reflective flakes and in the coating of crosslinking clearcoat compositions.

EXAMPLES

The invention is further illustrated by the following examples:

EXAMPLE 1

A carrier film was prepared from a blend described in U.S. Pat. No. 4,582,876 as follows:

A mixture of 55:45 parts by weight of polyester (1) and Dylark ® Sytrene Copolymer 600 was compounded by extrusion. Polyester (1) was derived from terephthalic acid, 19 mole % ethylene glycol and 81 mole % 1,4-cyclohexanedimethanol. Dylark ® Styrene Copolymer 600 is a rubber modified styrene-maleic anhydride copolymer available from ARCO Chemical Company, a division of Atlantic Richfield Company.

The blend was heated to 260°-290° C. and extruded through a die into a nip comprising two temperature-controlled chrome plated stainless steel rollers. The extruded web was then cooled on a chill roller. The thermoplastic film had a mean thickness of about 0.20 mm and a maximum thickness deviation of less than 0.02 mm.

The carrier film prepared as described above was extrusion coated with a thin tie-layer composition (diluted to 5% solids before coating). Before being diluted the composition comprised 75% water, 10% acrylic resin, 10% urethane resin, 1% methylpyrrolidone, 1% diethyleneglycol monobutyl ether, less than 1% ethylene glycol monohexyl ether, less than 1% N, N-dimethyl ethanolamine and about 0.05% FC 170 surfactant (sold by 3M Company). The diluted composition was coated through a 0.13 millimeter slot and dried at 40°-90° C. All percentages are by weight. The dry coverage was 0.54 g/m², the dry thickness being 0.0005-0.001 mm.

The metallic paint composition described below was metered from a nitrogen gas pressurized vessel through a coating hopper extrusion slot having a width of 0.25 millimeter onto the carrier film moving at a speed of 8 m/min. The coating roll was cooled with recirculating water to reduce the propensity of the coating to streak and to minimize precipitate formation on the hopper lip. The coating method and apparatus were substantially as described in U.S. Pat. No. 2,681,294 and included means for maintaining a pressure differential across opposite surfaces of the coating ribbon. The coating was dried at 27°-80° C. (dry coverage 43 g/m² and 0.6 mm thickness) in a plural-stage, continuous flat bed drying apparatus supplied with low velocity, warm air streams.

| Metallic Paint Composition | |
|---|---|
| Ingredient | Approx. % Weight |
| Deionized water | 50 |
| Urethane resin | 25 |
| Aluminum paste | 5 |
| Ethylene Glycol Monohexyl Ether | 5 |
| N-Methylpyrrolidone | 5 |
| Diethylene Glycol Monobutyl Ether | 1 |
| N,N-Dimethyl Ethanolamine | 1 |
| Xylene | 1 |
| Aliphatic Solvent Naphtha | 1 |
| Isopropyl Alcohol | <1 |

The dried, paint-coated web was wound on a take-up roll and again drawn through a coating station to form over the paint layer a uniform layer of a clear topcoat of the composition described below.

| Clear Topcoat Composition | |
|---|---|
| | Approx. % Weight |
| Component A | |
| Urethane Resin (polyol) | 60 |
| Toluene | 40 |
| Benzotriazole | 1 |
| (diluted to 51% solids with acetone) | |
| Component B* | |
| Polyfunctional aliphatic isocyanurate resin based on 1,6-hexamethylene | 100 |

| Clear Topcoat Composition | |
|---|---|
| -continued | |
| | Approx. % Weight |
| diisocyanate | |

*Available as Desmodur N-3300 from Mobay Corporation Coatings Division

Components A and B were mixed by means of an in-line mixer before reaching the coating hopper as described in the Hayward et al. patent application Ser. No. 189,090 now U.S. Pat. No. 4,832,991, cited above. The composition flowed from the mixer directly to an extrusion coating hopper of the type disclosed in U.S. Pat. No. 2,681,294 and was extrusion coated, in a single pass, through the narrow extrusion slot of the hopper. The web having on its surface the wet topcoat layer was then passed directly to a drying chamber where the topcoat layer was dried and cured by exposure to low velocity streams of warm, moderately humid air in a series of stages of successively increasing temperatures, the drying and curing procedure being substantially as disclosed in the Fronheiser et al. application Ser. No. 166,083 now U.S. Pat. No. 4,872,270 cited above. The dried clear topcoat layer applied in this single pass had a thickness of 0.03 mm. The so prepared sheet material was designated sheet material 1. A pressure sensitive adhesive layer was applied to the backside of the carrier film as described in the patent application, Ser. No. 116,426 now abandoned.

Another sheet material 2 was prepared in the same manner except that the clear topcoat was applied in two passes. The total dry thickness of the topcoat of sheet material 2 was 0.06 mm.

Thereafter a sheet material of the invention, sheet material 3, was prepared in the same manner except that the clear topcoat was applied in four passes. The total dry thickness of the topcoat of sheet material 3 was 0.12 mm.

A sample of each sheet material was heated by infrared lamps to a temperature of about 135° C. and then drawn by vacuum thermoforming into contact with a 7.5×30 cm inclined metal panel and adhesively bonded thereto. As they were drawn down onto the inclined panels, the samples stretched by an amount proportional to the distance along the panel, the area at the top of the panel (Top) having little or no stretch, and an area half-way down the panel (Center) having a stretch of about 70 percent.

Gloss and DOI measurements made at the top and center areas on each panel indicate the effect of stretching on the surface characteristics of the sheet material.

Gloss was measured by the ASTM D-523 method mixing a Hunter 20-Degree ASTM Glossmeter, and Distinctness of Image (DOI) was measured by the ASTM Test E-430 method using a Hunterlab Model D47R-6 Dorigon Glossmeter.

The results are shown in Table 1.

TABLE 1

| Sheet Material | Topcoat Thickness (mm) | Gloss | | | DOI | | |
|---|---|---|---|---|---|---|---|
| | | Top | Center | % Loss | Top | Center | % Loss |
| 1 | 0.03 | 70 | 14 | (80) | 16 | 3 | (81) |
| 2 | 0.06 | 88 | 42 | (52) | 29 | 7 | (76) |
| 3 | 0.12 | 94 | 80 | (15) | 90 | 41 | (54) |

The data show that an increase in the thickness of the clear topcoat provides a) improvement in the initial gloss and DOI in unstretched areas of the thermoformed sheet material (top of the panel), and b) reduction in the loss of gloss and DOI at the panel center after thermoforming and stretching of the sheet material. Thus only 15% loss of gloss occurred with the sheet material of the invention as compared with 52 and 80% loss with the thinner topcoat materials. Likewise, the loss of DOI with the sheet material of the invention was much less, namely 54% as compared with 81 and 76%.

Each of the sheet material samples was thermoformed and bonded to an inclined metal test panel as in Example 1.

EXAMPLE 2

Four sheet material samples were prepared and evaluated as in Example 1. The paint layer of each of the samples was formed from the metallic flake composition of Example 1. The dry thickness of the clear topcoats were approximately 0.07, 0.1, 0.2 and 0.25 mm, respectively.

Non-Flake Paint Example

Four additional sheet material samples were prepared and evaluated as described in Example 1. The paint layer for each sample was formed from a non-metallic white paint of the composition shown below. The clear topcoats had the same thicknesses as in Example 2.

Non-Flake Paint Composition

| Ingredient | Approx. % Weight |
| --- | --- |
| Titanium Dioxide | 25 |
| Ethylene Glycol Monohexyl Ether | 5 |
| Diethylene Glycol Monobutyl Ether | 1 |
| Deionized Water | 45 |
| N,N-Dimethyl Ethanolamine | 1 |
| N-Methylpyrrolidone | 5 |
| Urethane Resin | 20 |

Figure 4:
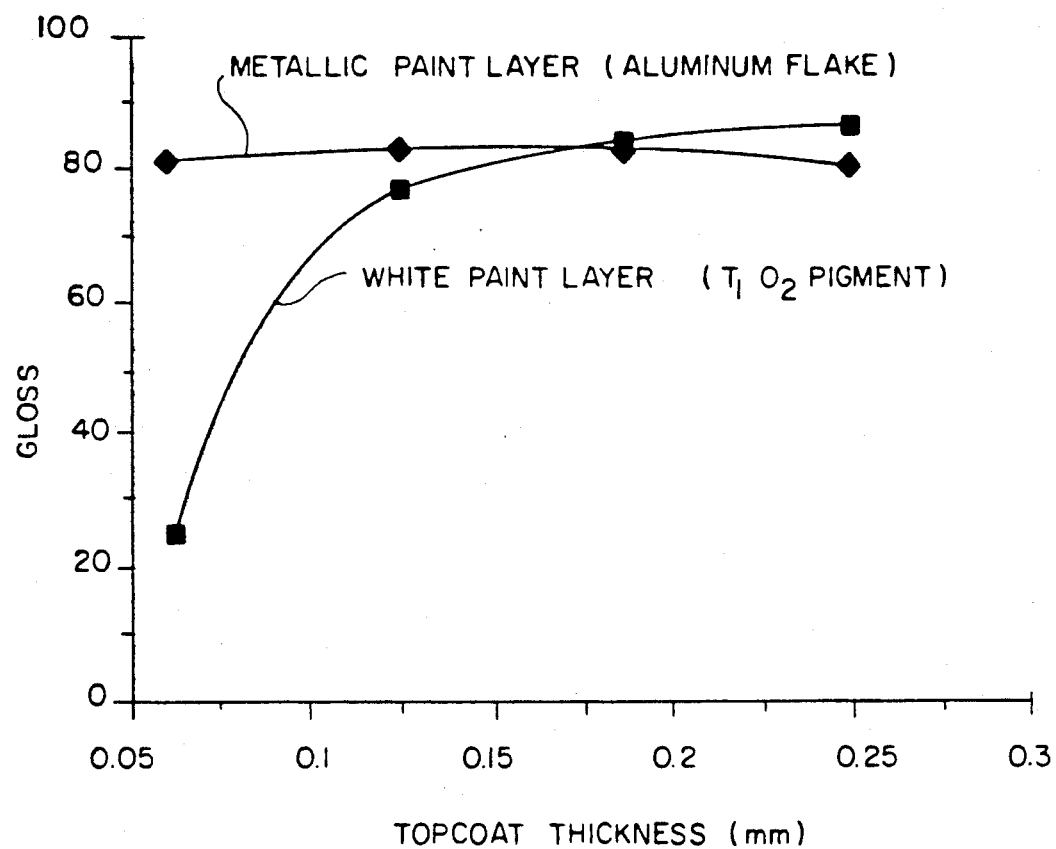
FIG. 4 is a graphical representation of gloss measurements after stretching of metallic and non-metallic paint-coated films having clearcoats of different thicknesses.

The retained gloss data, measured at the panel center for each of the stretched sheet materials of Example 2 and of the Non-Flake Paint Example are graphically illustrated in FIG. 4.

FIG. 4 shows that:

(a) gloss retention improves with increasing topcoat thickness in thermoformed sheet materials having a paint layer which contains light reflective flakes; and (b) the topcoat thickness has no apparent effect on gloss retention in thermoformed sheet materials having a paint layer which contains no flakes.

The manufacture of thermoformable films coated with flake-containing paints and having thick-crosslinked clearcoats is not believed to be suggested by the prior art. Thus it is not believed predictable that a film having a flake-containing paint layer which normally decreases in gloss when stretched, could be protected against loss of gloss or DOI by increasing to greater than 0.1 mm the thickness of the clearcoat which is coated and dried over the paint layer. It is entirely unexpected that such a thick crosslinked clearcoat would provide this benefit. Even more importantly, it has not heretofore been possible to obtain a method for manufacturing successfully a sheet material having such a thick crosslinked clearcoat and having the other characteristics of the applicant's sheet material, such as freedom from coating defects and extreme uniformity in thickness, appearance and quality. It is believed that any attempts to form such thick crosslinked clearcoats on a paint-coated thermoformable film by conventional automobile spray coating techniques or by other non-laminar flow methods will result in defective products.

The invention has been described in detail with particular reference to preferred embodiments thereof, but it will be understood that variations and modifications can be effected within the spirit and scope of the invention.

What is claimed is:

1. A protective and decorative sheet material for covering substrates comprising:
   a thin flexible carrier film;
   a protective and decorative paint layer adhered to one surface of said carrier film; said paint layer containing generally flat light reflective flakes;
   a transparent topcoat layer overlying said paint layer, said topcoat layer having a thickness of at least about 0.1 millimeter;
   said sheet material having a substantially unstressed relaxed state and a relaxed area; said sheet material being heat softenable to a substantially plastic state in which it is plastically extendable and formable over irregular surfaces to an extended state having an extended area at least 50% greater than said relaxed area; and
   said paint layer being adhered to said carrier film and said topcoat layer being adhered to said paint layer and both layers having a substantially uniform quality and appearance in both said relaxed and extended states of said sheet material.

2. A sheet material according to claim 1 wherein at least 75% of the flakes have an orientation within 12 degrees of parallelism with the outer surface of said paint layer.

3. The sheet material of claim 1 including an adhesion promoting layer between said carrier film and said paint layer.

4. The sheet material of claim 1 wherein said topcoat layer is a substantially clear layer of a crosslinked polyurethane.

5. The sheet material of claim 1 including a pressure-sensitive adhesive layer on the opposite side of said carrier film from said paint layer.

6. The sheet material of claim 1 wherein said carrier film comprises a thin, essentially planar stretchable thermoplastic polymeric film of substantially uniform thickness.

7. The sheet material of claim 1 wherein the flakes are metallic flakes.

8. The sheet material of claim 1 wherein said light reflective flakes are aluminum flakes.

9. A flexible and stretchable sheet material adapted for use in a thermoforming process in which it is stretched to conform to a three-dimensional substrate and bonded thereto so as to form a smooth and wrinkle-free protective and decorative coating thereon, said sheet material comprising:

(1) a thin, essentially planar, stretchable, thermoplastic polymeric carrier film of substantially uniform thickness; and (2) a thin protective and decorative paint layer of substantially uniform thickness on one surface of said thermoplastic polymeric carrier film, said paint layer comprising light reflective metallic flakes incorporated in a film-forming binder;

(3) a substantially clear topcoat layer of at least 0.1 millimeter uniform thickness adhered to said paint layer;

said thermoplastic polymeric carrier film having heat-softening and tensile elongation properties which adapt it to use in said thermoforming process; said paint layer and said topcoat layer having heat-softening and tensile elongation properties that are compatible with those of said thermoplastic polymeric carrier film so as to permit symmetrical elongation, whereby said sheet material can undergo substantial elongation by the application of stretching forces without crazing or delamination of said paint layer or said topcoat layer.

10. The sheet material of claim 1 wherein said carrier film comprises a blend of copolyesters based on poly(1,4-cyclohexylonedimethylene terephthalate) and styrene maleic anhydride copolymers.

* * * * *